(12) United States Patent
Konstadinidis et al.

(10) Patent No.: US 10,451,795 B2
(45) Date of Patent: Oct. 22, 2019

(54) OPTICAL FIBER FOR APPLICATIONS REQUIRING HIGH SYSTEM OPTICAL SIGNAL-TO-NOISE RATIO PERFORMANCE AND LOW DEGRADATION FROM NONLINEAR IMPAIRMENTS

(71) Applicant: OFS Fitel, LLC, Norcross, GA (US)

(72) Inventors: Kariofilis Konstadinidis, Decatur, GA (US); David W Peckham, Lawrenceville, GA (US); Debra A Simoff, Simsbury, CT (US)

(73) Assignee: OFS FITEL, LLC, Norcross, GA (US)

(*) Notice: Subject to any disclaimer, the term of this patent is extended or adjusted under 35 U.S.C. 154(b) by 0 days.

(21) Appl. No.: 16/183,224

(22) Filed: Nov. 7, 2018

(65) Prior Publication Data

US 2019/0146150 A1    May 16, 2019

Related U.S. Application Data

(60) Provisional application No. 62/587,160, filed on Nov. 16, 2017.

(51) Int. Cl.
*G02B 6/02*      (2006.01)
(52) U.S. Cl.
CPC ..... *G02B 6/02395* (2013.01); *G02B 6/02009* (2013.01); *G02B 6/02019* (2013.01)
(58) Field of Classification Search
CPC .. G02B 6/02; G02B 6/02395; G02B 6/02009; G02B 6/02019
See application file for complete search history.

(56) References Cited

U.S. PATENT DOCUMENTS

| | | |
|---|---|---|
| 2004/0013382 A1 | 1/2004 | Van Eekelen |
| 2009/0269015 A1 | 10/2009 | Nakajima |
| 2013/0148934 A1 | 6/2013 | Nakanishi |
| 2014/0308015 A1* | 10/2014 | Bookbinder ....... G02B 6/02395 385/124 |
| 2015/0293325 A1 | 10/2015 | Kasahara |
| 2017/0031092 A1 | 2/2017 | Sohma |

(Continued)

FOREIGN PATENT DOCUMENTS

WO     20170170652    10/2017

OTHER PUBLICATIONS

Gloge, D., "Optical-Fiber Packaging and Its Influence on Fiber Straightness and Loss", The Bell System Technical Journal, V. 54, No. 2, Feb. 1975, pp. 245-262.

(Continued)

*Primary Examiner* — Sung H Pak
*Assistant Examiner* — Hoang Q Tran
(74) *Attorney, Agent, or Firm* — Larry Maxwell, Esq.; Smith Tempel Blaha LLC

(57) ABSTRACT

A optical fiber having core and cladding regions, a primary coating, and a secondary coating may be defined in part by a curve relating the microbend sensitivity to a ratio of the elastic modulus of the secondary coating to the elastic modulus of the primary coating (as plotted on respective y and x axes). The curve has a substantially peaked shape defined by a positive-slope region and a negative-slope region. The ratio of the elastic modulus of the secondary coating to the elastic modulus of the primary coating is within the positive-slope region.

10 Claims, 5 Drawing Sheets

(56) References Cited

U.S. PATENT DOCUMENTS

2017/0184785 A1    6/2017    Tahibana

OTHER PUBLICATIONS

Grasso, G, et al., "Microbending Losses of Cabled Single Mode Fibres", Societa Cavi Pirelli S.pA.—Viale Sarca, 222-20126 Milano (Italy), pp. 526-532.
Cocchini, F., "The Lateral Rigidity of Double-Coated Optical Fibers", Journal of Lightwave Technology, vol. 13, No. 8, Aug. 1995, pp. 1706-1710.

\* cited by examiner

OPTICAL FIBER FOR APPLICATIONS REQUIRING HIGH SYSTEM OPTICAL SIGNAL-TO-NOISE RATIO PERFORMANCE AND LOW DEGRADATION FROM NONLINEAR IMPAIRMENTS

CROSS-REFERENCE TO RELATED APPLICATIONS

The benefit of and priority to U.S. Provisional Patent Application No. 62/587,160, filed Nov. 16, 2017, entitled "OPTICAL FIBER FOR APPLICATIONS REQUIRING HIGH SYSTEM OSNR PERFORMANCE AND LOW DEGRADATION FROM NONLINEAR IMPAIRMENTS AND HIGH CABLED FIBER DENSITY," is hereby claimed, and the contents thereof incorporated herein by this reference in their entirety as if fully set forth below and for all applicable purposes.

BACKGROUND

An optical fiber generally includes a core region and a cladding region, and may also include one or more coatings over the cladding region. Optical fibers may be bundled within tubing to form a cable. Meeting optical signal-to-noise ratio (OSNR) requirements for advanced modulation schemes employed in long-haul optical cable transmission system, such as submarine cable transmission systems, may require high signal power. However, high signal power may result in nonlinear propagation impairments. Providing a fiber with a high effective area (Aeff) is one way to help minimize nonlinear propagation impairments. However, the potential for microbending-related signal attenuation generally increases with increasing effective area.

High packing density is generally desirable in optical cables. Packing density is the ratio of the total cross-sectional area of the fibers (including coatings) to the cross-sectional area of the tubing interior in which the fibers are contained. The potential for excess microbending-related signal attenuation generally increases with increasing packing density, due to mechanical interaction among the fibers contained within the tube and related effects. Accordingly, minimizing the total coated fiber diameter can help keep the packing density low as the number of fibers within a cable is increased. For reasons including that a relatively large effective area may be desired and that the diameters of the glass (core and cladding) portions of a fiber are relatively standardized, it is generally undesirable to reduce those diameters. Therefore, fibers having relatively large effective area but with reduced coating thickness have been developed. However, such reduced-thickness coating fibers may nevertheless suffer from unacceptable microbending-related signal attenuation.

Coating properties may be carefully selected to help mitigate the undesirable effects of microbending. Coating a fiber with a thick layer of material with a low modulus of elasticity (also referred to as Young's modulus) may provide a "cushioning" layer with low lateral rigidity that may reduce the mechanical perturbations to the fiber axis that produce microbending loss. However, such a low modulus coating material may easily be damaged during the normal handling associated with fiber and cable manufacturing. For this reason, a composite dual-layer coating system, comprising an inner or "primary" coating of low modulus material with low lateral rigidity paired with an outer or "secondary" coating of high modulus material with high flexural stiffness, may help minimize microbend sensitivity while promoting resistance to damage during the normal handling associated with fiber and cable manufacturing.

SUMMARY

Embodiments of the invention relate to an optical fiber having a core region, a cladding region, a primary coating, and a secondary coating. The core region, cladding region, primary coating, and secondary coating together define a total fiber structure having a microbend sensitivity. The secondary coating has an elastic modulus higher than an elastic modulus of the primary coating. A curve relating the microbend sensitivity to a ratio between the elastic modulus of the secondary coating and the elastic modulus of the primary coating (as plotted on respective y and x axes) has a substantially peaked shape defined by a positive-slope region and a negative-slope region. The ratio between the elastic modulus of the secondary coating of the fiber and the elastic modulus of the primary coating of the fiber is within the positive-slope region.

Other systems, methods, features, and advantages will be or become apparent to one of skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
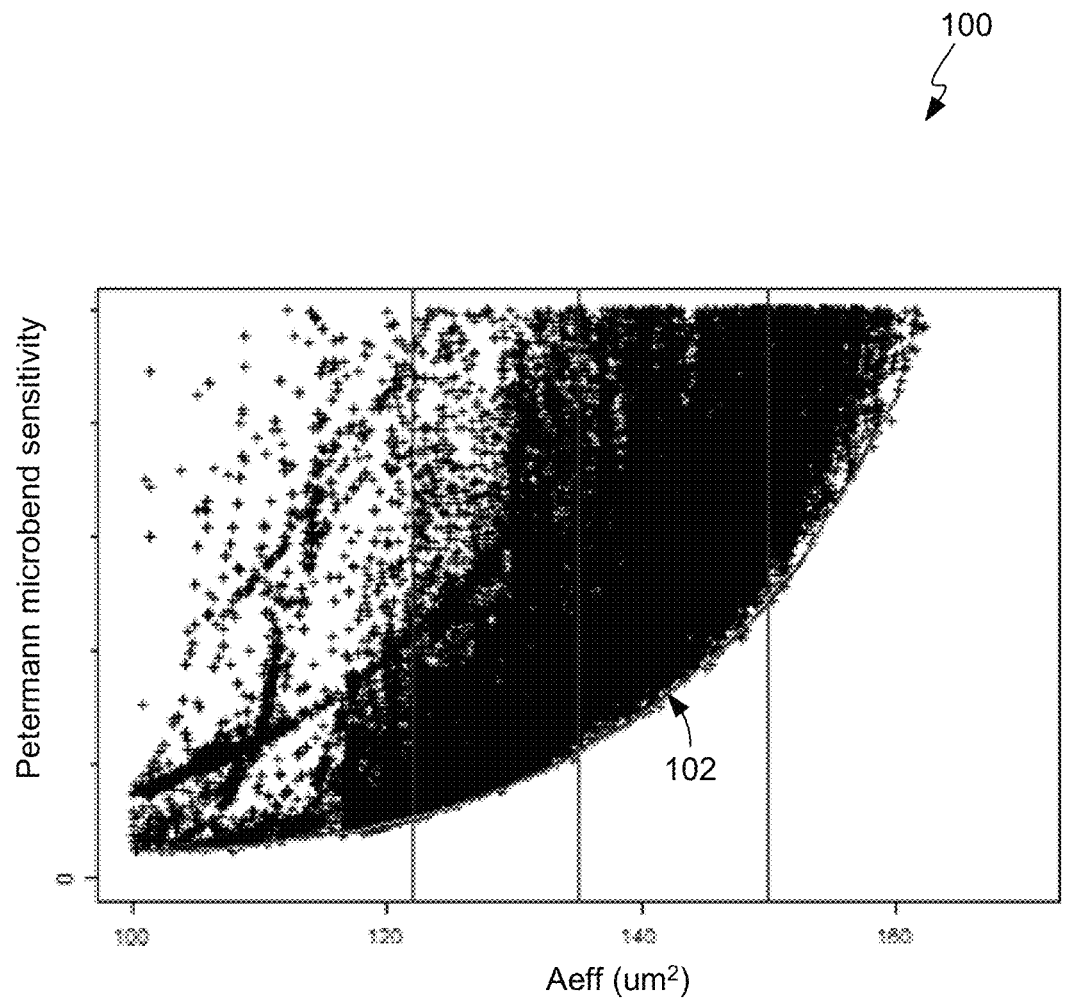
FIG. 1 is a plot of microbend sensitivity versus effective area for a large number of fibers.

FIG. 1 shows a plot 100 of Petermann microbend sensitivity versus the effective area for a large number of fibers with varying refractive index profiles. Solutions (represented by "+" symbols) from approximately 64,000 different fibers are plotted for fibers having an effective area ranging from about 100 μm$^2$ to about 160 μm$^2$. Effective area (Aeff) is a quantitative measure of the area over which the energy in the electric field is distributed. The microbend sensitivity of each fiber is calculated using a microbend loss model used based on a 1976 publication by K. Petermann. (K. Petermann. "Theory of Microbending Loss in Monomode Fibres with Arbitrary Refractive Index Profile," Archiv für Elektronik and Übertragungstechnik, vol. 30, no. 9 (1976), pp. 337-342.) The parameters defining the index profile shapes used to simulate these values of microbend sensitivity and Aeff, e.g., core radius, core delta, trench thickness, etc., span a range of values that are generally considered practical by those of ordinary skill in the art for fiber fabrication using standard practices and that yield values of other key properties, e.g., cutoff wavelength, macrobend sensitivity, etc., that are within a range of desired values as understood by those of ordinary skill in the art.

FIG. 1 depicts a known microbend frontier (MBF) curve 102 that represents a minimum microbend sensitivity for a fiber design and Aeff within a family of fiber designs. That is, for any given value of Aeff, the plot 100 shows that there is a minimum value of microbending sensitivity that is possible. Fibers that are located along the microbend frontier 102 and that also meet the requirements set for the other key parameters would represent an optimized design solution. So, fibers located on the microbend frontier 102 represent the best tradeoffs possible between achieving large Aeff and low microbending sensitivity.

Figure 2:
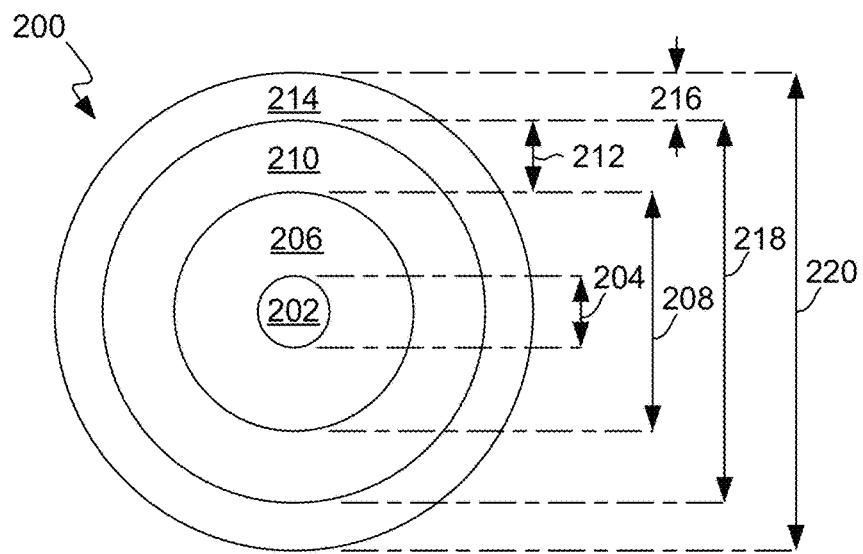
FIG. 2 is a cross-sectional view of a fiber.

As illustrated in FIG. 2, an exemplary optical fiber 200 may comprise a core region 202 having a core diameter 204, a cladding region 206 having a cladding diameter 208, a primary coating 210 having a primary coating thickness 212, and a secondary coating 214 having a secondary coating thickness 216. The uncoated fiber diameter, i.e., the diameter of cladding region 206, may be about 125 μm. Accordingly, optical fiber 200 has a primary coating diameter 218 and a secondary coating diameter 220. The secondary coating diameter is equal to the outside diameter of the total fiber structure consisting of core region 202, cladding region 206, primary coating 210, and secondary coating 214. The secondary coating diameter may be about 250 μm. Note that all references to a diameter herein are outside diameters. The Aeff of optical fiber 200 may be between about 110 and 170 μm².

Practitioners in the art have modeled relationships between Petermann microbend sensitivity, modulus of elasticity of primary coating 210 (which may be referred to for brevity herein as primary modulus), and modulus of elasticity of secondary coating 214 (which may be referred to for brevity herein as secondary modulus). This work has its origins in a model developed by Gloge relating microbend sensitivity, lateral rigidity, and flexural stiffness of a fiber. (See D. Gloge, "Optical Fiber Packaging and its Influence on Fiber Straightness and Loss," Bell System Technical Journal, Vol. 54, No. 2, February 1975, pp. 245-262.) Grasso, et al. presented a form of the Gloge and Petermann model in which microbend sensitivity, Δα, was expressed in the form of $$\Delta\alpha \sim \text{lateral pressure} \times C \quad \text{(Eq. 1)}$$

where C is approximately $$D/H^2 * P(\Omega_f)/(\Omega_f^6 \times w^2) \quad \text{(Eq. 2)}$$

where $P(\Omega_f)$ is the power spectrum of the surface roughness that the fiber is pressed against evaluated at radian frequency $\Omega_f$; $\Omega_f = 1/(k \times n_1 \times w^2)$; k is the free space wave number; $n_1$ is the core index; w is the mode field radius; D is lateral rigidity; and H is flexural rigidity of the fiber. The radian frequency $\Omega_f$ is that in which the surface roughness power spectrum results in loss through coupling between the fundamental mode and higher order lossy modes. (See G. Grasso, et al., "Microbending Losses of Cabled Single Mode Fibers," Proc. IOOC-ECOC'88, 1988, pp. 526-532). The Grasso, et al. model related to a fiber having a single coating, i.e., no secondary coating. Cocchini developed an expression for lateral rigidity (D) and flexural stiffness (H) for dual-coated fibers, i.e., having both a primary and a secondary coating:

$$D = E_1 + (E_2 - E_1)(E_1/E_2)^{2/3}(2(R_2 - R_1)/(R_2 - R_0))^{3/2} \quad \text{(Eq. 3)}$$

and $$H = \pi R_0^4 E_0 + \pi (R_2^4 - R_1^4) E^2 \quad \text{(Eq. 4)}$$

where $E_1$ is the modulus of the primary coating, $E_2$ is the modulus of the secondary coating, $R_1$ is the radius of the primary coating, $R_2$ is the radius of the secondary coating, and $R_0$ is the radius of the uncoated fiber (i.e., core plus cladding). Equation 3 holds provided that the coating dimensions are within the range $(R_2-R_1)/(R_2-R_0) \leq 0.5$. (See F. Cocchini, "The Lateral Rigidity of Double-Coated Optical Fibers," J. Lightwave Technology, IEEE, Vol. 13, No. 8, August 1995, pp. 1706-1710, at Eq. 19.)

Figure 3:
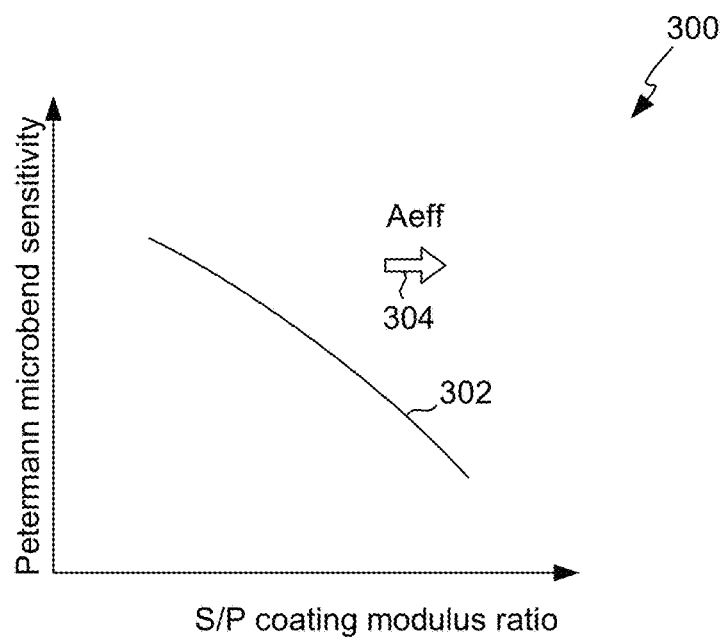
FIG. 3 is a conceptualized plot of a ratio of elastic modulus of a primary coating to elastic modulus of a secondary coating in relation to microbend sensitivity for an exemplary fiber.

The foregoing models have led practitioners in the art seeking to design fibers having higher Aeff than prior fibers to increase the secondary coating modulus and decrease the primary coating modulus to help mitigate the undesirable effects of microbending that would otherwise result from the increased Aeff. FIG. 3 is a conceptualized plot 300 relating microbend sensitivity to a ratio of secondary (S) modulus to primary (P) modulus. FIG. 3 is not intended to accurately reflect empirical data or a model but rather only to generally illustrate the conventional wisdom in the art that for purposes of addressing increasing Aeff an inverse relation exists between a change in microbend sensitivity and a change in the secondary/primary modulus ratio. That is, a curve 302 relating microbend sensitivity to the secondary/primary modulus ratio (on respective Y and X axes) of a fiber design similar in characteristics to those plotted in FIG. 1 would have a generally negative slope where the designs increase in Aeff as they approach the microbend frontier 102 (FIG. 1). Stated another way, a desire to increase Aeff (represented by the arrow 304) has suggested to practitioners in the art to, in effect, increase the secondary/primary modulus ratio correspondingly with an increase in Aeff to help mitigate the undesirable effects of microbending.

The following model may be used to generate fiber designs. For a given fiber waveguide design and surface roughness, then $P(\Omega_f)/(\Omega_f^6 \times w^2)$ in Equation 2 will be constant, so the effect of the coating properties on microbending sensitivity can be simplified to $$\Delta\alpha \sim D/H^2 \quad \text{(Eq. 5)}$$

This simplified microbending loss model may be used to compare the effects of coating material properties and dimensions on microbending sensitivity.

Figure 4:
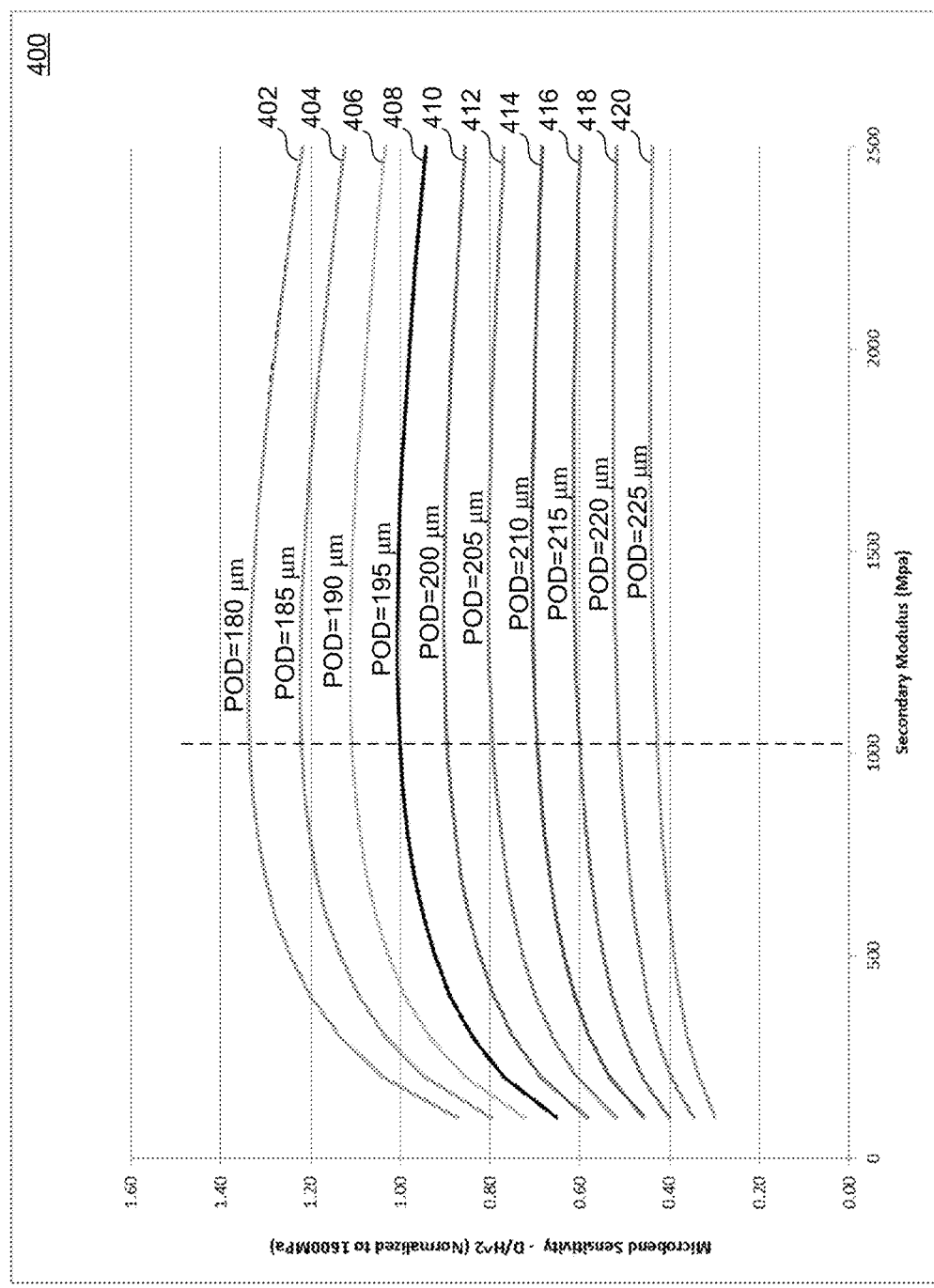
FIG. 4 is a plot relating secondary coating elastic modulus to microbend sensitivity for a number of fiber design curves representing fibers differing in primary coating thickness.

FIG. 4 is a plot 400 of ten fiber design curves 402, 404, 406, 408, 410, 412, 414, 416, 418, and 420 obtained using the model set forth in Equation 2. Each of fiber design curves 402-420 is based on the same secondary coating outside diameter 220 (FIG. 2), which may be 250 μm. In FIG. 4 the x-axis represents secondary modulus, and the y-axis represents microbend sensitivity. Each of fiber design curves 402-420 is based on the same primary modulus, which may be 1 megapascal (Mpa). Each of fiber design curves 402-420 is based on the same uncoated fiber diameter (or with reference to FIG. 2, the diameter 208 of cladding region 206), which may be about 125 μm. However, each of fiber design curves 402-420 is based on a different primary coating outside diameter (POD): fiber design curve 402 is based on a primary coating outside diameter 218 (FIG. 2) of 180 μm; fiber design curve 404 is based on a primary coating outside diameter 218 (FIG. 2) of 185 µm; fiber design curve 406 is based on a primary coating outside diameter 218 (FIG. 2) of 190 µm; fiber design curve 408 is based on a primary coating outside diameter 218 (FIG. 2) of 195 µm; fiber design curve 410 is based on a primary coating outside diameter 218 (FIG. 2) of 200 µm; fiber design curve 412 is based on a primary coating outside diameter 218 (FIG. 2) of 205 µm; fiber design curve 414 is based on a primary coating outside diameter 218 (FIG. 2) of 210 µm; fiber design curve 416 is based on a primary coating outside diameter 218 (FIG. 2) of 215 µm; fiber design curve 418 is based on a primary coating outside diameter 218 (FIG. 2) of 220 µm; and fiber design curve 420 is based on a primary coating outside diameter 218 (FIG. 2) of 225 µm.

In accordance with the present invention, it has been observed that in higher Aeff fiber designs the undesirable effects of microbending may be mitigated not only by increasing the secondary/primary modulus ratio but also by decreasing the secondary/primary modulus ratio. Note in FIG. 4 that above a secondary modulus of about 1000 MPa (and thus above a secondary/primary modulus ratio of about 1000, as the primary modulus in plot 400 is a constant 1 Mpa), many of fiber design curves 402-420 exhibit decreasing microbend sensitivity with increasing secondary/primary modulus ratio, the effect being most pronounced in those of fiber design curves 402-420 based on lower primary coating diameters (PODs) and at higher secondary/primary modulus ratios. That is, substantial portions of fiber design curves 402-420 above a secondary modulus of about 1000 Mpa (and thus above a secondary/primary modulus ratio of about 1000) exhibit at least a slightly negative slope. This effect comports with the known effect described above with regard to FIG. 3.

However, also note in FIG. 4 that below a secondary modulus of about 1000 MPa (and thus below a secondary/primary modulus ratio of about 1000), most of fiber design curves 402-420 exhibit decreasing microbend sensitivity with decreasing secondary/primary modulus ratio, the effect being most pronounced in those of fiber design curves 402-420 based on lower primary coating diameters (PODs) and at lower secondary/primary modulus ratios. That is, substantial portions of fiber design curves 402-420 below a secondary modulus of about 1000 MPa (and thus below a secondary/primary modulus ratio of about 1000) exhibit at least a slightly positive slope. More particularly, portions of fiber design curves 402-420 below a secondary modulus of about 500 Mpa (and thus below a secondary/primary modulus ratio of about 500) exhibit a particularly steep positive slope. Still more particularly, fiber design curves 402, 404, 406, 408, and 410, which correspondingly have primary coating diameters in the range of 180-200 µm, exhibit a steep positive slope below a secondary modulus of about 500 Mpa (and thus below a secondary/primary modulus ratio of about 500), such as between a secondary modulus of about 100 and 500 Mpa (and thus between a secondary/primary modulus ratio of about 100-500). Although not shown in FIG. 4, yet another such fiber design curve could have a primary coating diameter of 155 µm and an even steeper positive slope portion than fiber design curve 402. These fiber design curves thus define a range of primary coating diameters of 155-225 µm, with a preferred range of 155-200 µm.

From FIG. 4, it can be appreciated that at low secondary modulus the microbending sensitivity can be lower than at high secondary modulus. Prior art secondary coatings generally have high secondary modulus (e.g., greater than 500 Mpa), and the conventional wisdom or motivation in the prior art has led practitioners in the art to develop fibers with as high a secondary modulus as possible. However, in accordance with the present invention, and contrary to the conventional wisdom or motivation in the prior art, it has been discovered that lowering the secondary modulus improves the lowering of microbending sensitivity. This is because even though low secondary modulus decreases flexural stiffness H, which raises microbending sensitivity (because it is in the denominator of Equation 2), the lateral rigidity D decreases at a faster rate, and the microbending sensitivity decreases. This suggests that in some higher Aeff fiber designs the undesirable effects of microbending may be mitigated by decreasing the secondary/primary modulus ratio in association with increasing Aeff. In FIG. 4 a secondary/primary modulus ratio of about 1000 represents a peak or transition between a region of positive slope and a region of negative slope.

Figure 5:
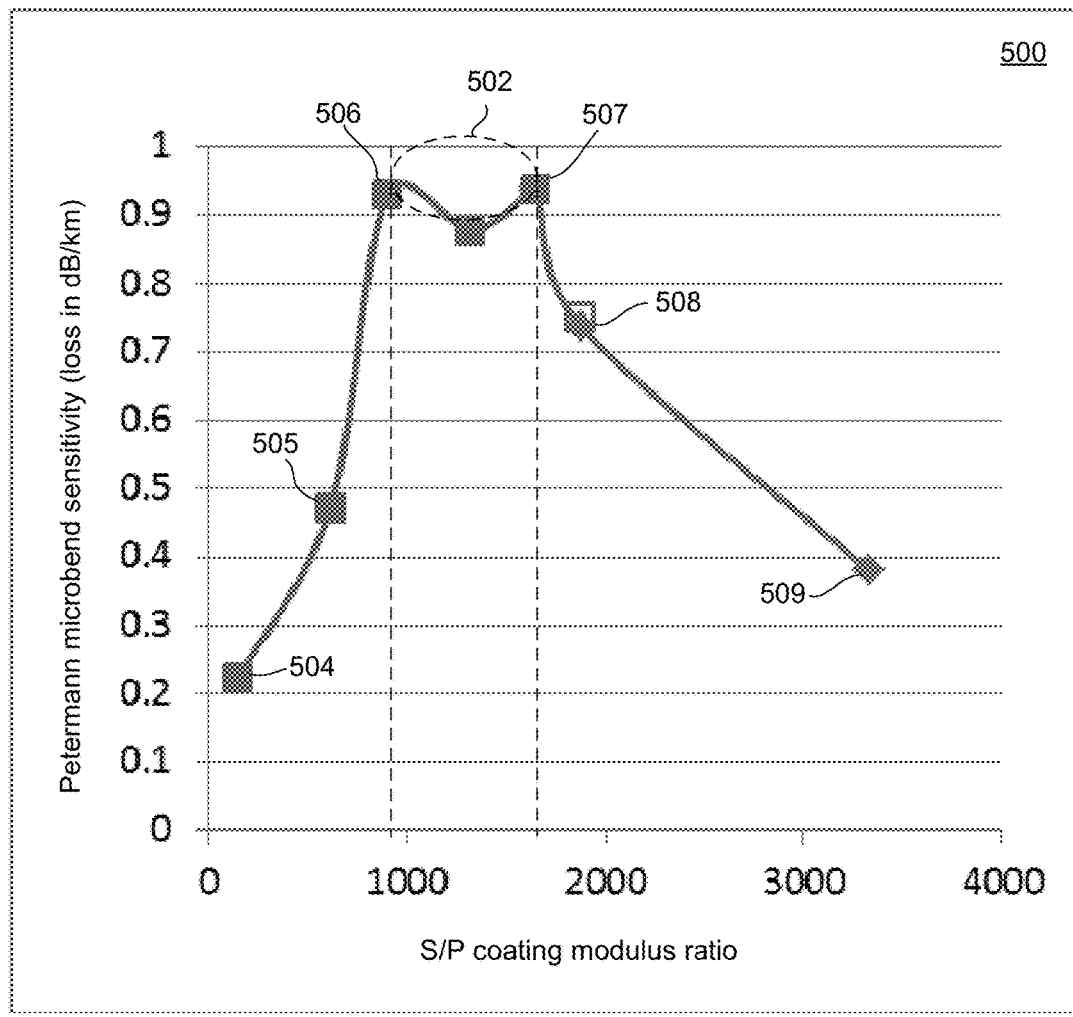
FIG. 5 is a plot of a ratio of primary coating elastic modulus to secondary coating elastic modulus in relation to microbend sensitivity for a number of exemplary fibers.

FIG. 5 is a plot 500 of selected fiber designs having not only different secondary/primary modulus ratios but also different coating curing techniques, spanning a range generally considered practical for fiber fabrication using standard practices by those of ordinary skill in the art. In FIG. 5 the x-axis represents secondary/primary modulus ratio, and the y-axis represents microbend sensitivity. An advantage of a plot of this type is that data may be gathered from the same draw trial, i.e., using the same glass preform, without having to change coating materials. The plotted points 504, 505, 506, and 507 were obtained by using different curing conditions using the same coating material, where the total UV dose decreases as secondary/primary modulus ratio decreases, with the effect being decreasing secondary modulus and slightly increasing primary modulus. The plotted points 508 and 509 were obtained by using different coating materials. The "peaked" shape of plot 500 is more pronounced than that of above-described plot 400. In plot 500, a sharp decrease in microbend sensitivity may be observed with decreasing secondary/primary modulus ratio below about 1000. That is, below a secondary/primary modulus ratio of about 1000, plot 500 has a positive slope. Similarly, a sharp decrease in microbend sensitivity may be observed with increasing secondary/primary modulus ratio above about 1750. That is, above a secondary/primary modulus ratio of about 1750, plot 500 has a negative slope. Between these regions of positive and negative slope is a peak region 502. The term "peak region" as used herein means a relatively small transitional region between a major region of positive slope and a major region of negative slope. A peak region may have localized sub-regions of different slope, as in the example shown in FIG. 5. Any curve characterized by peak region connecting a positive-slope region and a negative-slope region has a "peaked shape."

Figure 6:
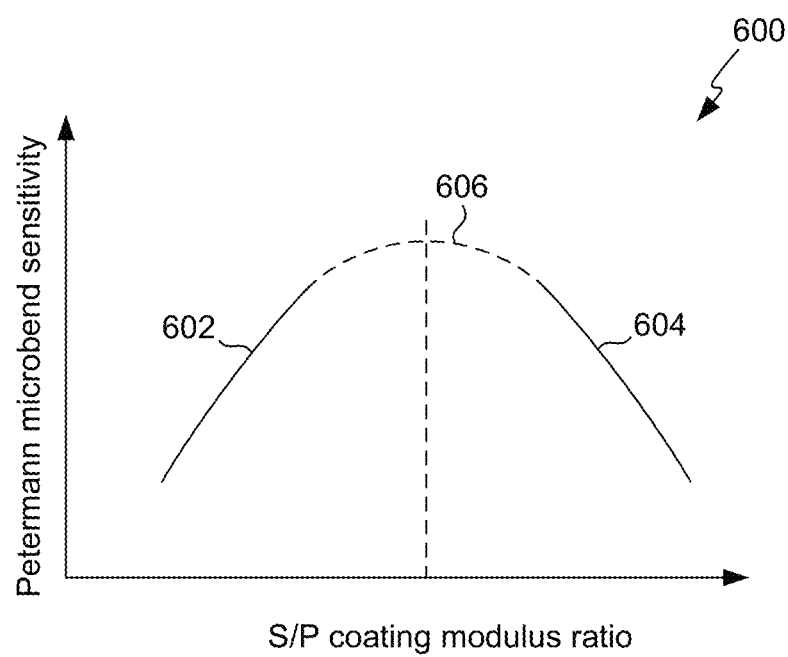
FIG. 6 is similar to FIG. 3, but revealing a positive-slope region connected to a negative-slope region by a transitional region.

FIG. 6 illustrates in conceptual or generalized form a curve 600 relating microbend sensitivity of a family of fibers to their secondary/primary modulus ratios. Note that curve 600 has a substantially peaked shape defined by a positive-slope region 602 and a negative-slope region 604. The family of fibers thus includes those having a secondary/primary modulus ratio within the positive-slope region 602. A transitional region 606 (indicated in broken line) between positive-slope region 602 and a negative-slope region 604 may have any shape, including, for example, localized sub-regions of varying slope. The family of fibers represented by FIGS. 4-6 may be characterized in part by an effective area of between about 110 and 170 µm². The family of fibers represented by FIGS. 4-6 may be characterized in part by a secondary/primary modulus ratio less than about 1000. For example, fibers may have primary modulus of about 1 Mpa and a secondary modulus in a range between 100 Mpa and 500 Mpa.

The family of fibers represented by FIGS. 4-6 also may be characterized in part by an outside diameter 220 (FIG. 2) of between about 190 and 260 μm.

One or more illustrative or exemplary embodiments of the invention have been described above. However, it is to be understood that the invention is defined by the appended claims and is not limited to the specific embodiments described.

What is claimed is:

1. An optical fiber, comprising:
a core region;
a cladding region surrounding the core region;
a primary coating surrounding the cladding region and having a primary elastic modulus; and
a secondary coating surrounding the primary coating and having a secondary elastic modulus higher than the primary elastic modulus, the core region, cladding region, primary coating, and secondary coating together defining a total fiber structure having a microbend sensitivity, wherein a curve relating the microbend sensitivity to a ratio between the secondary elastic modulus and the primary elastic modulus on respective y and x axes has a substantially peaked shape defined by a positive-slope region and a negative-slope region, and the ratio is within the positive-slope region.

2. The optical fiber of claim 1, wherein the total fiber structure has an effective area of between about 110 and 170 square microns (μm$^2$).

3. The optical fiber of claim 1, wherein the ratio between the secondary elastic modulus and the primary elastic modulus is less than about 1000.

4. The optical fiber of claim 3, wherein the ratio is less than about 500.

5. The optical fiber of claim 3, wherein the primary coating has an outside diameter between about 155 and 225 microns (μm).

6. The optical fiber of claim 5, wherein the primary coating has an outside diameter between about 155 and 200 microns (μm).

7. The optical fiber of claim 1, wherein:
the total fiber structure has an outside diameter of between about 190 and 260 microns (μm);
the primary elastic modulus is about 1 megapascal (Mpa); and
the secondary elastic modulus is between about 100 and 500 Mpa.

8. The optical fiber of claim 1, wherein:
the total fiber structure has an effective area of between about 110 and 170 square microns (μm$^2$);
the total fiber structure has an outside diameter of between about 190 and 260 μm; and
the ratio between the elastic modulus of the secondary coating and the elastic modulus of the primary coating is less than about 1000.

9. An optical fiber, comprising:
a core region;
a cladding region surrounding the core region;
a primary coating surrounding the cladding region, the primary coating having a primary elastic modulus and an outside diameter between about 155 and 200 microns (μm); and
a secondary coating surrounding the primary coating and having a secondary elastic modulus, the core region, cladding region, primary coating, and secondary coating together defining a total fiber structure having an effective area of between about 110 and 170 square microns (μm$^2$) and an outside diameter of between about 190 and 260 μm, wherein a ratio of the secondary elastic modulus to the primary elastic modulus is less than about 1000.

10. The optical fiber of claim 9, wherein:
the primary elastic modulus is about 1 megapascal (Mpa); and
the secondary elastic modulus is between about 100 and 500 Mpa.

* * * * *